United States Patent
Johnson et al.

(10) Patent No.: US 7,995,747 B2
(45) Date of Patent: *Aug. 9, 2011

(54) WEATHER GUARD

(75) Inventors: Carrie Johnson, Longwood, FL (US); Charles Sawyer, II, Orlando, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/140,429

(22) Filed: Jun. 17, 2008

(65) Prior Publication Data

US 2008/0245485 A1   Oct. 9, 2008

Related U.S. Application Data

(63) Continuation of application No. 10/751,603, filed on Jan. 5, 2004, now Pat. No. 7,388,956.

(51) Int. Cl.
*H04M 9/00* (2006.01)
*H04M 1/00* (2006.01)

(52) U.S. Cl. .................................. 379/451; 379/453
(58) Field of Classification Search ........... 379/399.01, 379/413.02, 451, 453; 135/90, 97, 117, 123, 135/124, 125, 126, 128–161; 52/27.5, 73, 52/74, 79.6, 97, 173.2; 160/20, 57, 58.1
See application file for complete search history.

(56) References Cited

U.S. PATENT DOCUMENTS

| | | | | | |
|---|---|---|---|---|---|
| 1,433,458 | A | * | 10/1922 | Isaacson et al. | 160/132 |
| 2,581,251 | A | * | 1/1952 | Glazer et al. | 379/453 |
| 4,355,650 | A | * | 10/1982 | Beaudry | 135/130 |
| 4,884,589 | A | * | 12/1989 | Simpson | 135/117 |
| 5,798,485 | A | * | 8/1998 | Rohde et al. | 174/383 |

* cited by examiner

*Primary Examiner* — Davetta W Goins
*Assistant Examiner* — Phylesha Dabney
(74) *Attorney, Agent, or Firm* — Scott P. Zimmerman PLLC

(57) ABSTRACT

A weather guard is disclosed having a frame, a pair of members, a vertical support member, and a bracket.

9 Claims, 5 Drawing Sheets

WEATHER GUARD

CROSS-REFERENCE TO RELATED APPLICATIONS

This application is a continuation of U.S. application Ser. No. 10/751,603, filed Jan. 5, 2004, now issued as U.S. Pat. No. 7,388,956, and incorporated herein by reference in its entirety.

BACKGROUND

In the telecommunication industry, utility industry, and other related industries, it is common practice to locate electrical and electronic hardware devices and equipment outdoors (collectively referred to herein as electronic devices), in electronic enclosures, and in various types of structures such as dwellings and/or equipment shelters. Generally, the electronic devices are located in an enclosure or in a structure for protection against ambient weather and other environmental conditions. These enclosures may be formed of several materials such as metal, polymer, plastic, ceramic, glass, crystal, and/or combinations thereof. Also, the enclosures may be formed in any shape. The structures are small shelters designed to house the electronic devices, which also may be located inside an enclosure, and in some cases the structures are dwellings and/or commercial establishments.

The enclosures and structures are generally installed outdoors. Accordingly, any sensitive electronic devices contained in the enclosures and structures are subjected to the ambient weather and other environmental conditions each time the enclosures and structures are opened to allow service personnel access to the hardware and devices located inside. Enclosures include, for example, cross-boxes, tandem boxes, digital subscriber line access multiplexer (DSLAM) boxes, demarcation network interface devices (NID), splice cases, mesa cabinets, remote terminal sites, SLCC sites, and splice locations are not weatherproof, they generally cannot be accessed during inclement weather. While other protection devices may offer some protection against rain that falls vertically (e.g., perpendicular to the Earth's surface), these devices do not offer adequate lateral protection and do not completely cover the enclosures, openings in the structures being worked in, from the sides. Therefore, both the service personnel, the hardware and/or equipment are subject to laterally driven environmental influences such as rain, snow, hail, and other windblown matter, and any types of inclement weather conditions laterally driven towards the sides of the enclosures and or structures either directly or at some angle thereto.

When it is necessary to perform service on the electronic devices contained in the outdoor enclosures or dwellings, service personnel must provide the service at the site where the enclosure or dwelling is located. When the service is performed during inclement weather conditions, there exists a chance that any electronic devices located inside the enclosure or structure will be affected by the inclement weather. This is true whether there is driving rain, wind, blown sand, dust, and dirt. The service personnel also require protection while servicing the hardware and equipment in such inclement weather conditions. Therefore, while the service personnel are servicing the electronic devices and other equipment contained in the outdoor enclosure during equipment upgrades, testing, maintenance, service outage problems, and other service requirements, the technician and the electrical and/or electronic hardware devices and other equipment must be protected to prevent them from exposure to inclement weather conditions and degrading over time. Telecommunication systems failures due to degraded electronic devices and other equipment cause unnecessary labor costs associated with the replacement of the electronic devices and other equipment. This includes the labor costs associated with sending a technician in the field to perform the repairs, the cost of having customers or users out of service, and any other costs associated with making unnecessary trouble shooting calls.

SUMMARY

In one general respect, an embodiment of the present invention is directed to a weather guard. The weather guard includes a frame and a plurality of interconnected rigid members defining a supporting structure. The frame also includes a pair of opposed horizontal transverse members rigidly attached to a pair of opposed cross members substantially perpendicular to the transverse members forming a substantially horizontal rigid body; at least one downwardly extending vertical support member connected to the horizontal rigid body, the at least one vertical support member is connected to one of the cross members; at least one bracket comprising a first end and a second end, the first end is attached to the horizontal rigid body and the second end extends downwardly at an angle θ to the vertical support member, wherein the second end of the at least one bracket is attached to the vertical support member; and a membrane attached to the frame defining an opening, wherein the membrane forms a shield against environmental conditions inside the opening.

In another general respect, an embodiment of the present invention is directed to a weather guard. The weather guard includes a frame comprising a plurality of interconnected rigid members defining a supporting structure. The frame also includes a pair of opposed horizontal transverse members rigidly attached to a pair of opposed cross members substantially perpendicular to the transverse members forming a substantially horizontal rigid body; at least one downwardly extending vertical support member connected to the horizontal rigid body, the at least one vertical support member is connected to one of the cross members; at least one bracket comprising a first end and a second end, the first end is attached to the horizontal rigid body and the second end extends downwardly at an angle θ to the vertical support member, wherein the second end of the at least one bracket is attached to the vertical support member; a membrane attached to the frame defining an opening, wherein the membrane forms a shield against environmental conditions inside the opening; and first and second back panels forming a back cover of the weather guard, wherein the first and second back panels are adapted to releasably fasten to each other.

Other apparatuses and systems according to embodiments of the present invention will be or become apparent to one with skill in the art upon examination of the following drawings and detailed description. It is intended that all such additional apparatuses and systems be included within this description, be within the scope of the present invention, and be protected by the accompanying claims.

DESCRIPTION OF THE DRAWINGS

Embodiments of the present invention are described herein in conjunction with the following figures, wherein.

DESCRIPTION

Figure 3:
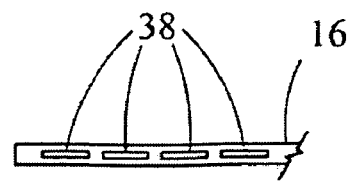
FIG. 3 illustrates an attachment feature in accordance with one embodiment of the present invention.

It is to be understood that the figures and descriptions of the various embodiments of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The term "enclosure" as used throughout this description and claims may comprise any type of terminals, closures, housings, cabinets, and other devices and structures for locating electronic devices therein. The term "electronic devices" as used throughout this description and claims may comprise any type of electrical hardware devices, electronic hardware devices, electrical components, electronic components, circuit boards, telecommunications equipment, and/or any other equipment. As used throughout the description, "environmental conditions" include but are not limited to a wide range of ambient temperatures, sunlight, humidity, moisture, rain, sleet, snow, ice, and airborne or windblown sand, dust and dirt prevalent in outdoor environments.

Although the specific embodiments of the several example enclosures described this description have a substantially rectangular polygonal shape, the scope of the present invention is intended to encompass any enclosures having any shape or form for performing the function of containing, housing, and/or protecting the electronic devices located inside the enclosure regardless of its shape or size.

Referring now to the several drawings in which identical elements are numbered identically throughout, a description of this invention now will be provided, in which exemplary embodiments are shown in the several figures. This invention may, however, be embodied in many different forms and should not be construed as being limited to the embodiments set forth herein. Rather, these embodiments are provided so that this disclosure will be thorough and complete, and will fully convey the scope of the invention to those having ordinary skill in the art. Furthermore, all statements herein reciting embodiments of the invention, as well as specific examples thereof, are intended to encompass both structural and functional equivalents thereof. Moreover, it is intended that such equivalents include both currently known equivalents as well as equivalents developed in the future for performing the same function, regardless of structure. Thus, those skilled in the art will appreciate that the schematic drawings presented herein and the like, represent conceptual views of illustrative structures which may embody the various aspects of this invention.

In the claims appended hereto any element expressed as a means for performing a specified function is to encompass any way of performing that function including, for example, a combination of elements that perform that function. Furthermore the invention as defined by such means-plus-function claims resides in the fact that the functionalities provided by the various recited means are combined and brought together in the manner that the claims called for. Therefore, any means that can provide such functionalities may be considered equivalents to the means shown herein.

Embodiments of the present invention provide a weather guard that defines an aperture and conforms generally about any one of an electronic equipment enclosure, an opening defined in the enclosure, and/or an opening of a structure, dwelling, or equipment shelter that houses electronic devices. The weather guard according to one of many embodiments of the present invention also provides at least one vertical side panel for protecting the service personnel and/or the electronic devices from matter driven laterally either directly or at a slant to the side panel. The weather guard according to one of many embodiments of the present invention also provides at least one horizontal top panel for protecting the service personnel and/or the electronic devices from matter driven downwardly substantially perpendicular to the top panel. The weather guard according to one of many embodiments of the present invention also includes mounting features for removeably attaching the weather guard to an enclosure, or structure. In use, the weather guard according to one of many embodiments of the present invention protects both the service personnel and the electronic devices located inside the enclosure or structure. The weather guard also protects any tools and/or equipment being carried or used by the service personnel while providing the service. Accordingly, the service personnel can continue working even under inclement weather conditions, even when there is laterally driven matter, for example, directly or at a slant to the side panel.

In one of many embodiments, the present invention provides a weather guard for use with enclosures or any structures for housing electronic devices, wherein the enclosures and structures are located outdoors. The enclosures, for example, house electronic devices associated with telecommunications equipment (e.g., telephone, television, cable television, satellite), utilities equipment such as gas, water, and electric measurement and communication equipment, and other equipment. The enclosures and structures protect the electronic devices from environmental conditions including inclement weather such as rain, snow, wind, sleet, and ice, and other environmental conditions such as wind blown sand, dust, and dirt. In one of many embodiments of the present invention, the weather guard protects the service personnel and the electronic equipment from laterally driven as well as overhead driven environmental conditions while a service personnel services the electronic devices located inside the various enclosures or structures. Embodiments of the present invention protect electronic devices located inside the enclosure or structure from any environmental conditions and forces including those described above that are laterally driven at an angle or a slant to the front, rear, or sides of the enclosure and or structure.

The weather guard according to the various embodiments of the present invention may be contained or stored in an interior portion of the enclosure or structure and is adapted to be stored in and removed from the interior portion of the enclosure or structure. The weather guard also includes fasteners to attach the weather guard to the enclosure and/or to an exterior portion of the structure around an opening thereof. The weather guard can be removeably attached or fixed to a portion of the enclosure or around the opening of the structure in such a manner as to shield the service technician and the electronic devices inside against adverse environmental conditions as previously described. Embodiments of the present invention provide a weather guard that can be folded, rolled, or collapsed into a form that makes it convenient to handle and store. This facilitates storage and transport of the weather guard from site to site where it can be temporarily installed as may be necessary.

Figure 1:
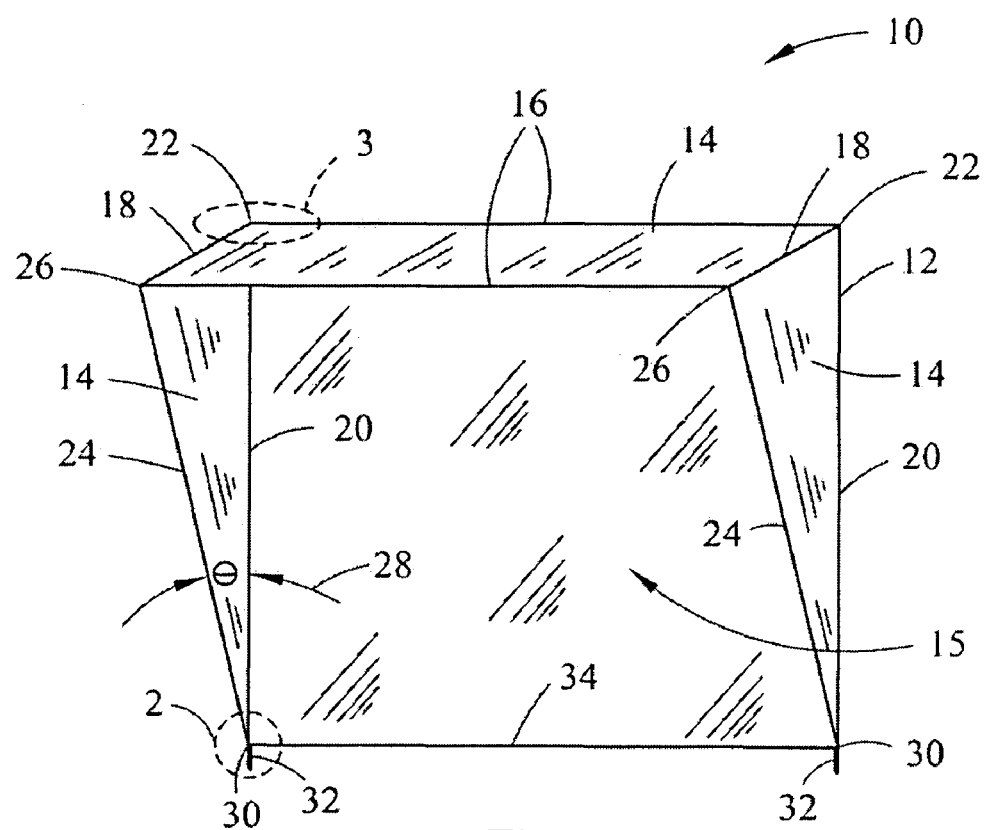
FIG. 1 illustrates an open back weather guard in accordance with one embodiment of the present invention.

Turning now to FIG. 1, one of many embodiments of the present invention provides an open back weather guard 10 comprising a frame 12 forming a supporting structure for an impermeable membrane 14. The frame 12 includes a plurality of rigid yet somewhat flexible members arranged to form a supporting structure for attaching the membrane 14 to the frame 12 and defining an opening 15. Embodiments of the present invention provide the membrane 14 either as a single impermeable membrane or as a plurality of impermeable membranes in the form of individual panels that are separately attachable to the frame 12 (e.g., to the plurality of rigid members). The plurality of rigid members forming the frame 12 comprise a pair of opposed horizontal transverse members 16 rigidly attached to a pair of opposed cross members 18 substantially perpendicular to the transverse members 16 so as to form a substantially horizontal rigid body for supporting a horizontal portion of the membrane 12 or an individual horizontal membrane panel. The frame 12 further comprises at least one downwardly extending vertical support member 20 connected to the horizontal rigid body either at the transverse member 16, the cross member 18, or at an intersection point 22 thereof. In one of many embodiments of the present invention, the vertical support member 20 is connected to one of the corresponding cross members 18. Other embodiments of the present invention include two opposing downwardly extending vertical support members 20 connected to each one of the corresponding cross members 18 of the substantially horizontal rigid body. In addition, the frame 12 comprises at least one bracket 24 attached on one end to one side of the corresponding cross member 18, one of the transverse members 16, or at an intersection point 26 thereof and extends downwardly at an angle θ 28 to the vertical support member 20, where it is attached to at the other end 30. Other embodiments of the present invention include two brackets 24 attached on one end to the opposing cross members 18, transverse members 16, or at the intersection point 26 thereof. The brackets 24 project downwardly and each bracket 24 is attached to the corresponding vertical support member 20 at the other end 30.

Figure 2:
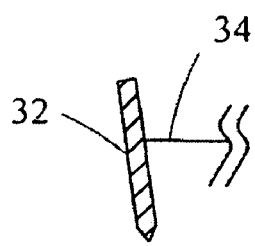
FIG. 2 illustrates a weather guard leg in accordance with one embodiment of the present invention.

As illustrated in FIG. 2, embodiments of the present invention also include a frame 12 that comprises at least one leg 32 attached to one of the vertical support members 20, one of the brackets 24, or at an intersection point 30 thereof. The leg 32 can be in the form of a stake for anchoring the frame to the ground. Embodiments of the present invention also include a frame 12 comprising an additional horizontal transverse brace member 34 that can be attached between the vertical support members 20, for example, to brace the frame 12 and thus increase its stability and strength.

Embodiments of the present invention comprise vertical support members 20 having an adjustable length (e.g., extendable) in order to accommodate enclosures and structural openings of varying height. In some embodiments of the present invention, the extendable vertical support members 20 may be retractable comprising a fixed member and a moveable member wherein the moveable member is fixed, for example, by a setscrew, a wing nut, nut and bolt assembly, clamp, or other similar releasable fastener. In other embodiments of the present invention, the extendable vertical support members are telescopically extendable.

The plurality of rigid yet somewhat flexible members forming the frame 12 are arranged and interconnected to each other such that the frame 12 can be easily set-up and dismantled. In one embodiment of the present invention, the plurality of rigid yet somewhat flexible members are fitted to each other such that they can be readily assembled and taken apart. In other embodiments of the present invention, the members are fixedly connected to each other by welding, nuts and bolts, by screws, and other fixedly mountable methods. Yet in other embodiments of the present invention, the members are pivotally connected to each other such that the frame 12 can be readily folded for storage and transport.

Those skilled in the art will appreciate that the individual members or components of the frame 12 such as the transverse members 16, the vertical support members 20, the brackets 24, and the horizontal brace member 34 are constructed from rigid and yet somewhat flexible elongated elements. The elongated elements can take many forms. For example, the elements can be elongated having a square, rectangular, cylindrical shape, or any other suitable elongated form comprising a polygonal shape (e.g., pentagonal, hexagonal, heptagonal, octagonal, and the like). Further, the elements can be brackets having an "L" shape, a flat shaped, a "U" channel shape, a "C" channel shape, and any other suitable elongated form, for example. The elongated elements include both solid or tubular-like structural features and any combinations thereof.

Furthermore, the individual components of the frame 12 according to various embodiments of the present invention are fabricated from a variety of substantially rigid yet flexible engineering materials. Embodiments of the frame 12 components are formed from a variety of suitable materials such as metals, alloys, polymeric materials, and ceramics and/or combinations thereof capable of withstanding various outdoor environmental conditions. In one of many embodiments, the frame 12 components enclosure are formed from any suitable engineering material such as metal, alloy, plastic, or ceramic used in the fabrication of machinery, machinery components, structural shapes, tools, instruments, and other items. Their hardness, strength, machinability, dimensional stability, nonflammability, and resistance to corrosion, acids, solvents, and heat may characterize the properties of such suitable engineering materials. Examples of such suitable engineering materials include but are not limited to: metals and alloys such as aluminum, beryllium, brass, bronze, cast iron, copper, lead, magnesium, steel, tantalum, zinc, zirconium, and various other trademarked alloys; ceramics such as glass and porcelain; and plastics such as Acrylonitrile-butadiene-styrene (ABS) resin, acetal resin, acrylic resin, fluorocarbon polymer, nylon, phenolformaldehyde resin, polybutylene terephthalate, polycarbonate, polyethylene, polyphenylene oxide, polypropylene, polystyrene, reinforced plastics (FRP), ureaformaldehyde resin, acrylic, polyurethane, polyvinylchloride (PVC), thermoplastics, thermoset plastics, and any combinations and/or compositions thereof including fiber reinforced and carbon fiber reinforced combinations and/or compositions thereof. The frame 12 components are formed from any of the engineering materials recited above, and/or any combinations thereof, and may include suitable coatings capable of withstanding a variety of outdoor environmental conditions including those described above. In one embodiment of the present invention, for example, the frame 12 is formed of G90 galvanized steel having a durable finish coating, such as a polyurethane powder coating.

The open back weather guard 10 according to embodiments of the present invention further comprises an impermeable membrane 14 attached to the frame 12 so as to provide the necessary protective shielding function from various outdoor environmental conditions such as, for example, inclement weather conditions including but not limited to protection form a wide range of temperatures, sunlight, humidity, moisture, rain, sleet, snow, ice, airborne or windblown sand, dust and dirt, and other environmental conditions, forces or elements. As discussed previously, the impermeable membrane 14 can be formed as a single sheet that attaches to the frame 12 or can be formed as a plurality of sheets or panels that can be individually attached to the various elements of the frame 12.

The open back weather guard 10 according to various embodiments of the present invention also comprises an impermeable membrane 14 that includes a plurality of folds such that the open back weather guard 10 can easily and readily be folded and made ready for storage and transport. In other embodiments the impermeable membrane 14 is removable and can be folded, rolled, transported, and stored separately from the frame 12.

The membrane 14 can be attached to the frame by a plurality of methods, for example. Accordingly, embodiments of the present invention provide an impermeable membrane 14 or panels that are fixed or attached to the frame 12 by a plurality of methods. For example, embodiments of the present invention provides an impermeable membrane 14 or panels fixed or attached to the frame 12 using a plurality of fasteners such as clamps, dowels, pins, bolts, rivets, screws, glue, hooks, clips, clasps, interlocking surfaces, seams, and other well known fastening methods. Also, those skilled in the art will appreciate that the membrane 14 can be attached or fixed to the frame using snaps, buttons/loops, zippers, or hook-and-loop fasteners such as Velcro®, for example.

Embodiments of the membrane 14 according to the present invention are fabricated from a variety of suitable materials. For example, the membrane 14 can be fabricated from a clear plastic material that has an optical transmission quality that allows ambient light to pass therethrough. The membrane 14 also can be fabricated from a variety of coated and uncoated polymeric materials such as, for example, nylon, polyester, vinyl coated nylon, and the like. The membrane also can be fabricated from other fibers such as cotton, wool, polyester/wool blend, polyester/cotton blend, nylon/wool, nylon/cotton blend, felt, flax, hemp, jute, linen, rayon, silk, satin and other similar textiles and materials and any blends thereof. The membrane 14 also can be fabricated from lightweight fabrics, coated fabrics, and/or fabric/laminates that are lightweight, waterproof, windproof, and breathable such as GORE-TEX® fabric, for example. The membrane 14 also may comprise a nylon outer shell fabric that is laminated to a waterproof, windproof, breathable membrane such as a GORE-TEX® membrane, for example. The membrane 14 also can be fabricated from aramid fibers and high performance aramid fibers that may be suitable for weaving fabrics including, but are not limited to Kevlar®, an organic fiber produced by the DuPont Corporation.

As illustrated in FIG. 3, embodiments of the present invention also include a fastener 38 on the portion on the horizontal transverse member 16 that abuts the electronic enclosure or structure. The fastener 38 allows the open back weather guard 10 to be removeably engaged to the electronic enclosure or structure. The attachment features include, but are not limited to magnets, clamps, hooks, clips, clasps, and other well known removeably fastening methods, for example. Also, those skilled in the art will appreciate that the open back weather guard 10 can be attached or fixed to the electronic enclosure or structure using snaps, buttons/loops, zippers, or hook-and-loop fasteners such as Velcro®, for example.

Figure 4:
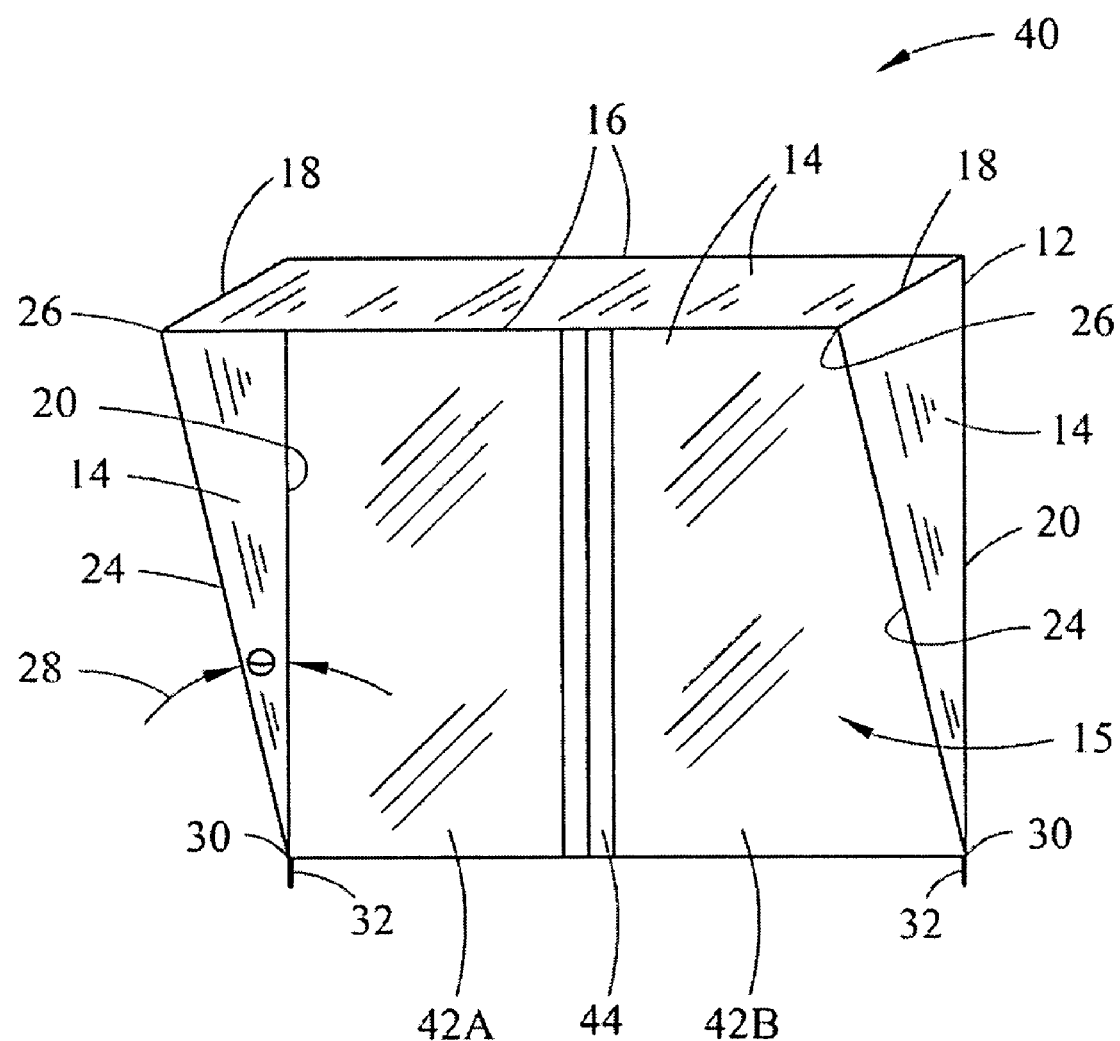
FIG. 4 illustrates a closed back weather guard in accordance with one embodiment of the present invention.

FIG. 4 illustrates a closed back weather guard 40 according to one of many embodiments of the present invention. The closed back weather guard 40 comprises similar features to the open back weather guard 10 previously described with respect to FIGS. 1-3. The closed back weather guard 40 further comprises first and second back panels 42A, B formed out of the impermeable membrane 14 material. The back panels 42A,B are fastened by way of a releasable fastener 44 provided in between the two back panels 42A, B. The releasable fastener 44 allows the back panels 42A, B to conform around equipment located on a structure. The releasable fastener 44 includes hooks, clips, clasps, interlocking surfaces, seams, as well as snaps, buttons/loops, zippers, or hook-and-loop fasteners such as Velcro®, for example, and other well known releasable fastening methods.

Figure 6:
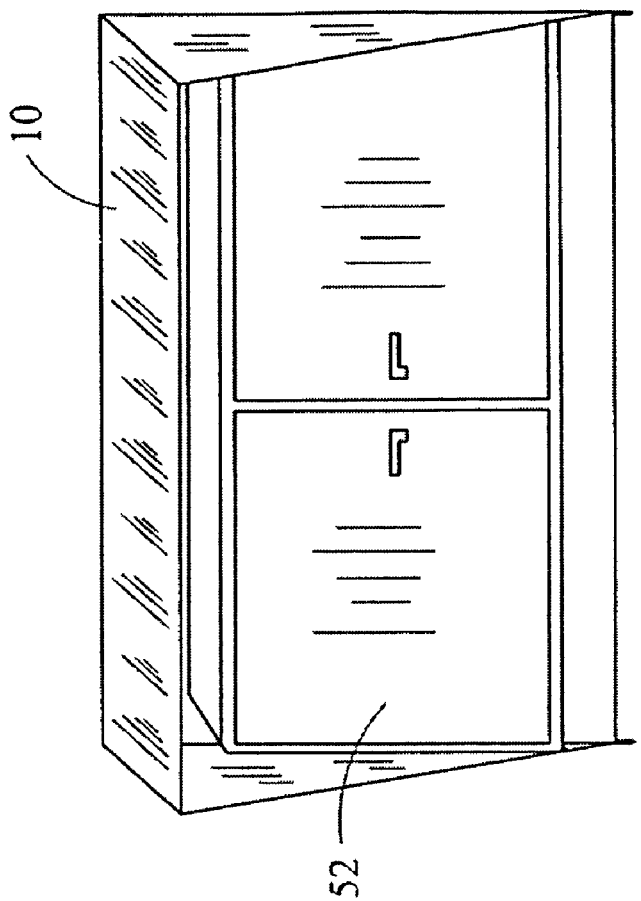
FIG. 6 illustrates an open back weather guard in accordance with one embodiment of the present invention in place about an electronic enclosure.
Figure 5:
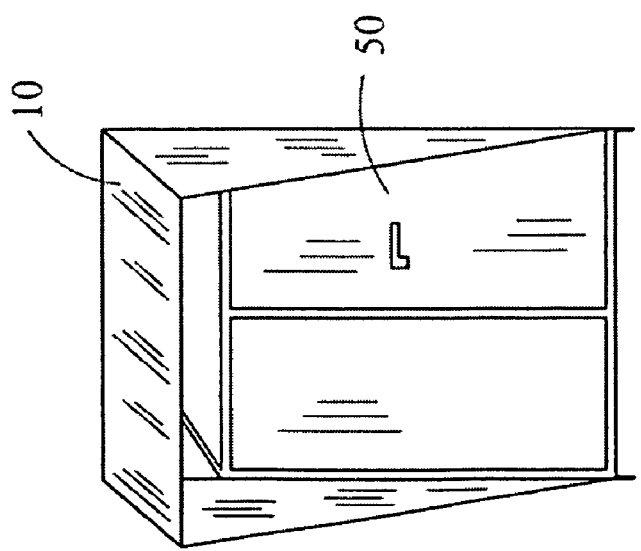
FIG. 5 illustrates an open back weather guard in accordance with one embodiment of the present invention in place about an electronic enclosure.

FIGS. 5 and 6 illustrate two environments in which the open back weather guard 10 may be used. FIG. 5 illustrates the open back weather guard 10 in place about one of many types of electronic enclosures 50. FIG. 6 illustrates the closed back weather guard 40 in place about one of many types of electronic enclosures 52.

Figure 7:
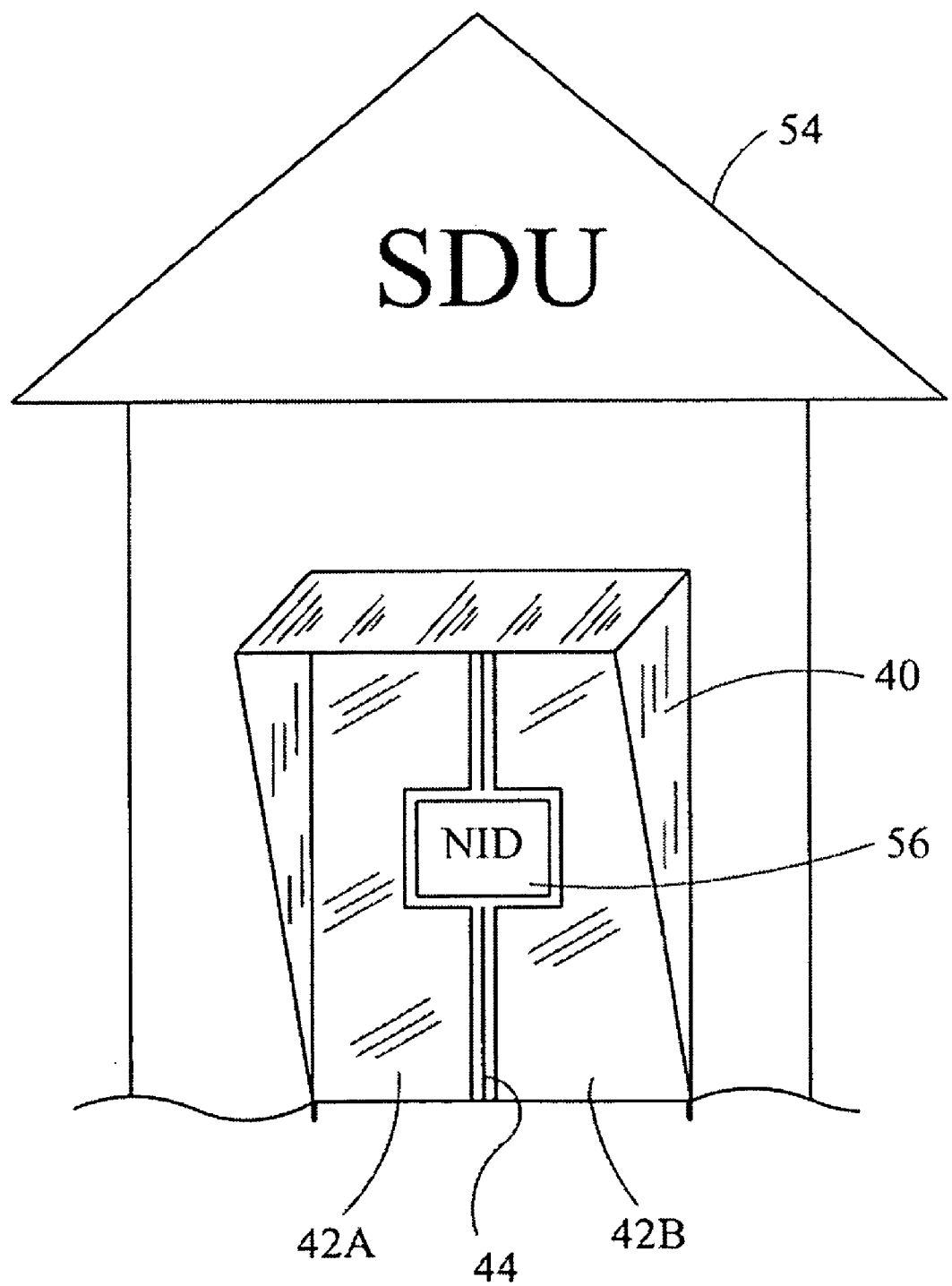
FIG. 7 illustrates a closed back weather guard in accordance with one embodiment of the present invention abutting a structure.

FIG. 7 illustrates one environment in which the closed back weather guard 40 may be used. As illustrated, the closed back weather guard 40 is located abutting a single dwelling unit (SDU) structure 54 to which an electronic enclosure 56 is mounted. The electronic enclosure 56 is, for example, a network interface device (NID). The back panels 42A, B conform around the electronic enclosure 56. The releasable fastener 44 closes both back panels 42A, B about the electronic enclosure 56 to protect it from environmental conditions.

Figure 8:
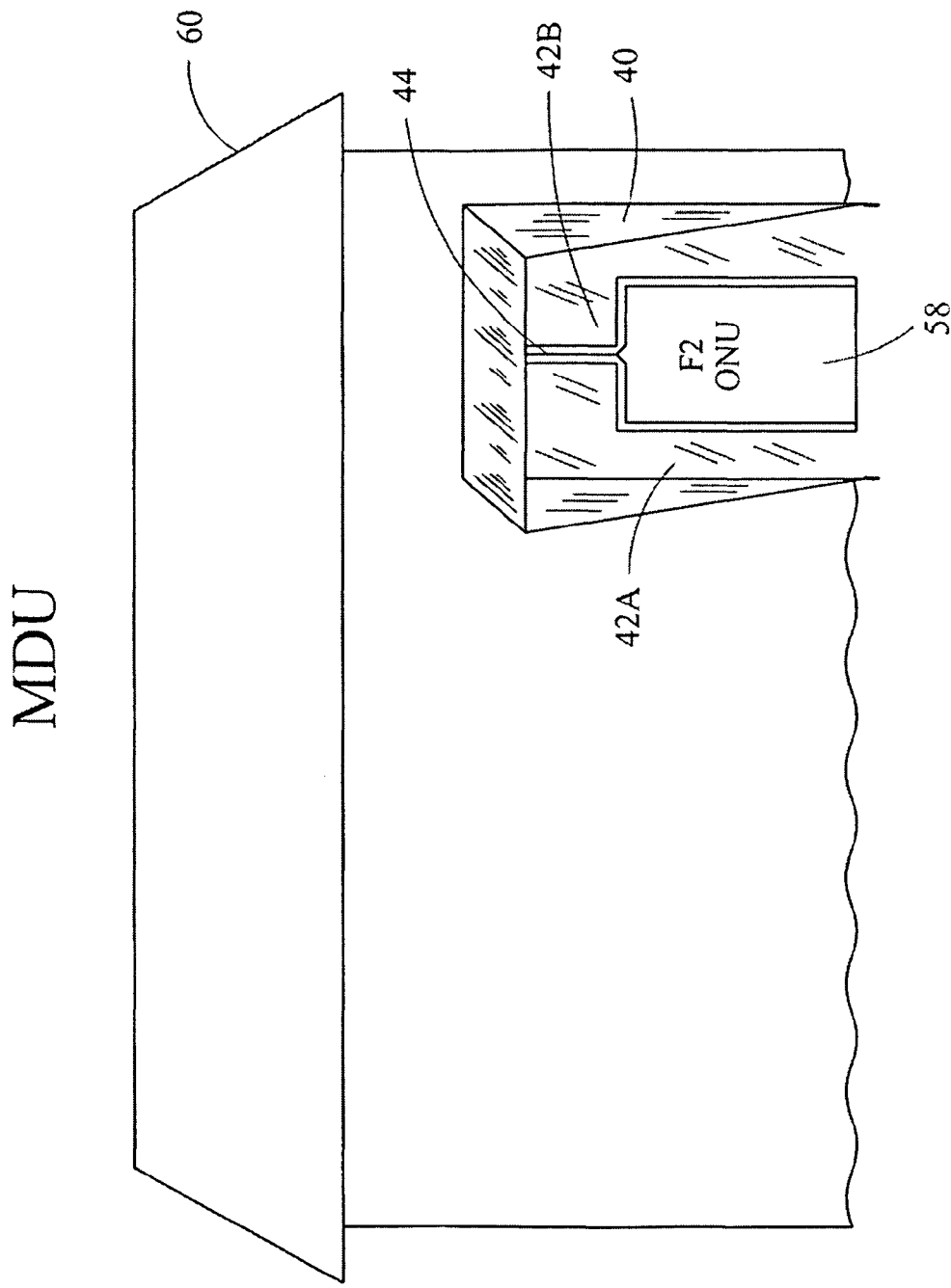
FIG. 8 illustrates a closed back weather guard in accordance with another embodiment of the present invention abutting a structure.

FIG. 8 illustrates another environment in which the closed back weather guard 40 may be used. As illustrated, the closed back weather guard 40 is located abutting a multiple dwelling unit (MDU) structure 60 to which an electronic enclosure 58 is mounted. The back panels 42A, B conform around the electronic enclosure 58. The releasable fastener 44 closes both back panels 42A, B about the electronic enclosure 58 to protect it from environmental conditions.

Although the present invention has been described with regard to certain embodiments, those of ordinary skill in the art will recognize that many modifications and variations of the present invention may be implemented. The foregoing description and the following claims are intended to cover all such modifications and variations. Furthermore, the components and processes disclosed are illustrative, but are not exhaustive. Other components and processes also may be used to make systems and methods embodying the present invention.

The invention claimed is:

1. A weather guard, comprising:
a frame comprising a horizontal top, a left side, and a right side;
the horizontal top comprising four rigid, tubular members arranged to form a rectangle;
the left side comprising a left-side tubular rear member having a top end and a bottom end, the top end attached to a left back corner of the horizontal top, the left-side tubular member downwardly extending to the bottom end;
the left side also having a left-side tubular bracket attached to the bottom end of the left-side tubular rear member, the left-side tubular bracket upwardly extending at an angle and having a left-side tubular bracket top end attached to a front left corner of the horizontal top;

the right side comprising a right-side tubular rear member having a top and a bottom, the top attached to a right back corner of the horizontal top, the right-side tubular member downwardly extending to the bottom end;

the right side also having a right-side tubular bracket attached to the bottom of the right-side tubular rear member, the right-side tubular bracket upwardly extending at the angle and having a top bracket end attached to a front right corner of the horizontal top;

a top membrane panel attached to the horizontal top and shielding telecommunications equipment housed from environmental elements;

side membrane panels attached to the left side and to the right side shielding the telecommunications equipment from the environmental elements; and an open back in the frame such that the top membrane panel and the side membrane panels shield the telecommunications equipment from environmental conditions.

2. The weather guard according to claim 1, wherein the horizontal top comprises a pair of horizontally opposed transverse members.

3. The weather guard according to claim 2, wherein the horizontal top comprises a pair of opposing cross members that are substantially perpendicular to the transverse members.

4. The weather guard according to claim 1, wherein each rear member is telescopically extensible and retractable in length.

5. The weather guard according to claim 1, further comprising a fastener for removeably attaching the weather guard.

6. The weather guard according to claim 1, further comprising a ground stake downwardly extending from the bottom of the right-side tubular member.

7. The weather guard according to claim 1, further comprising a horizontal brace extending between the bottom of the right-side tubular member and the bottom end of the left-side tubular member.

8. The weather guard according to claim 1, wherein the top membrane includes a fold.

9. A weather guard, comprising:

a frame comprising a horizontal top, a left side, and a right side;

the horizontal top comprising four rigid, tubular members arranged to form a rectangle;

the left side having two rigid, tubular members comprising a left-side tubular rear member and a left-side tubular bracket, the left-side tubular rear member extensible and retractable in length and having a top end attached to a left back corner of the horizontal top, the left-side tubular member downwardly extending to a bottom end, the left-side tubular bracket attached to the bottom end of the left-side tubular rear member, the left-side tubular bracket upwardly extending at an angle and having a top end attached to a front left corner of the horizontal top;

the right side also having two rigid, tubular members comprising a right-side tubular rear member and a right-side tubular bracket, the right-side tubular rear member extensible and retractable in length and having a top end attached to a right back corner of the horizontal top, the right-side tubular member downwardly extending to a bottom end, the right-side tubular bracket attached to the bottom end of the right-side tubular rear member, the right-side tubular bracket upwardly extending at the angle and having a top end attached to a front right corner of the horizontal top;

a top membrane panel attached to the horizontal top and shielding telecommunications equipment housed from environmental elements;

side membrane panels attached to the left side and the right side also shielding the telecommunications equipment from the environmental elements; and an open back in the frame such that the top membrane panel and the side membrane panels shield the telecommunications equipment from environmental conditions.

* * * * *